United States Patent [19]

Uehara

[11] Patent Number: 4,937,735

[45] Date of Patent: Jun. 26, 1990

[54] MEMORY ACCESS SYSTEM UTILIZING ADDRESS TRANSLATION

[75] Inventor: Izushi Uehara, Tokyo, Japan

[73] Assignee: NEC Corporation, Tokyo, Japan

[21] Appl. No.: 250,284

[22] Filed: Sep. 28, 1988

[30] Foreign Application Priority Data

Sep. 28, 1987 [JP] Japan .............................. 62-240868

[51] Int. Cl.⁵ .............................................. G06F 12/10
[52] U.S. Cl. .............................. 364/200; 364/238.4; 364/256.3; 364/256.4
[58] Field of Search .............................. 364/200, 900

[56] References Cited

U.S. PATENT DOCUMENTS 4,563,737 1/1986 Nakamura et al. ................ 364/200
4,763,250 8/1988 Keshlear et al. ................... 364/200

Primary Examiner—Raulfe B. Zache
Attorney, Agent, or Firm—Sughrue, Mion, Zinn, Macpeak & Seas

[57] ABSTRACT

In a memory access system used for receiving a logical address and a memory request, translating the logical address into a real address, and accessing a memory by using the real address, a non-address-translation portion, which is not an object to be translated, in the logical address is transmitted in advance to the memory through an address signal line when the memory request associated with the logical address supplied to the memory is generated, and an address-translation portion, which is an object to be translated, in the logical address is transmitted to the memory through the address signal line upon completion of address translation of the address-translation portion.

3 Claims, 2 Drawing Sheets

MEMORY ACCESS SYSTEM UTILIZING ADDRESS TRANSLATION

BACKGROUND OF THE INVENTION

The present invention relates to a memory access system and, more particularly, to a memory access system for translating a logical address supplied from a processor into a real address and accessing a memory by using this real address.

In a memory access system of a paging system, for example, an address consists of page and intra-page addresses which are respectively represented by the upper and lower bit portions. Each real intra-page address is common to each logical intra-page address. Therefore, an intra-page address is not an object of address translation.

In a conventional memory access system, a real address is generated by combining a translated address portion and a non-translated address portion upon completion of address translation. More specifically, in an architecture employing the paging system, after a logical page address in a logical address is translated by an address translator into a real page address, the real page address is combined with an intra-page address, and the resultant address is transmitted to a memory as a real address. In other words, even if the intra-page address is established prior to address translation, processing of the intra-page address is started only upon completion of address translation of the page address, thus posing a problem. If page and intra-page addresses are divisionally transmitted to a main memory, both the addresses must be time-divisionally transmitted by using one address line, or address lines must be exclusively arranged for the addresses. However, since address translation normally requires one machine cycle, an extra machine cycle is required in time-divisional transmission, and hence degradation in performance is inevitably caused.

On the other hand, with an improvement in LSI technology, demands have surfaced for higher processing speed and reliability, and high-integration, high-density mounting of elements has been developed. As a result, one LSI chip or one mounting card requires a great number of input/output signal lines. Therefore, a decrease in number of input/output signal lines is indispensable for high-integration, high-density mounting.

SUMMARY OF THE INVENTION

It is an object of the present invention to provide a memory access system which can solve the above-described problems of conventional systems and decrease the number of signal lines without degrading the performance.

It is another object of the present invention to provide a memory access system of a paging system which can transmit a page address and an intra-page address through the same address line without causing a one machine-cycle delay.

According to the present invention, there is provided a memory access system for receiving a logical address and a memory request, translating the logical address into a real address, and accessing a memory by using the real address, comprising: means for transmitting a non-address-translation portion, which is not an object to be translated, in the logical address to the memory through an address signal line in advance when the memory request associated with the logical address supplied to the memory is generated; and means for transmitting an address translation portion, which is an object to be translated, in the logical address to the memory through the address signal line upon completion of address translation of the address-translation portion.

DETAILED DESCRIPTION OF THE PREFERRED EMBODIMENT

Figure 1:
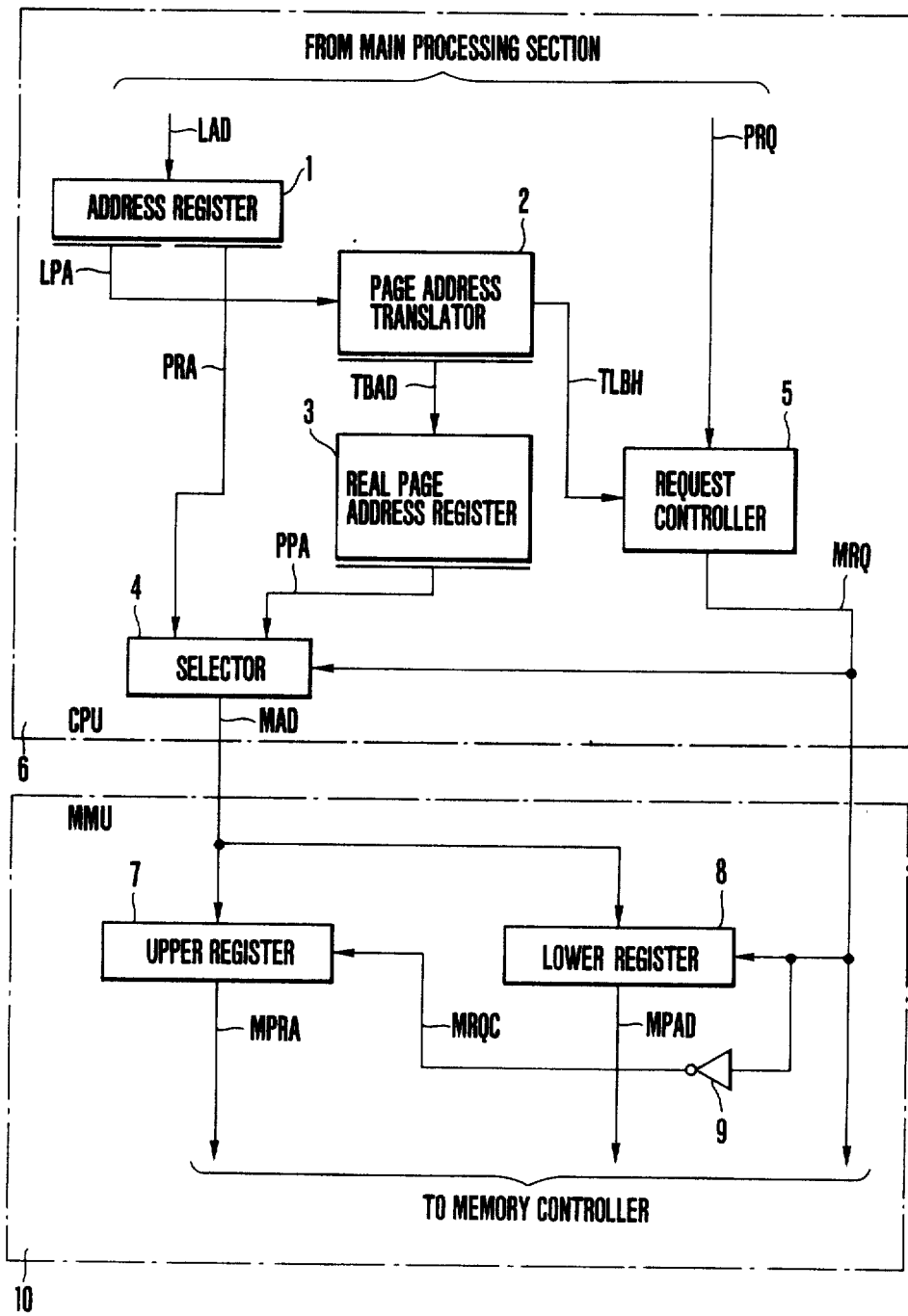
FIG. 1 is a block diagram showing an arrangement of an embodiment of the present invention.

FIG. 1 is a block diagram showing a memory access system of a paging system according to an embodiment of the present invention.

Referring to FIG. 1, reference numeral 1 denotes an address register for storing a logical address signal LAD supplied from a processor (not shown); 2, a page address translator for receiving a logical page address signal LPA representing a logical page address included in the upper portion of the address register 1, translating the logical page address into a real page address by referring to an internal translation table, outputting a real page address signal TBAD representing the translated real page address, and outputting a translation success signal TLBH representing whether address translation has been successful or not; 3, a real page address register for storing the real page address signal TBAD from the page address translator 2; 4, a selector, controlled by a memory request signal MRQ, for selecting an output from the lower portion of the address register 1, i.e., an intra-page address signal PRA, or a real page address signal PPA output from the real page address register 3, and outputting the selected signal as a memory address signal MAD; 5, a request controller for receiving a request signal PRQ supplied from the processor and the translation success signal TLBH output from the page address translator 2, and outputting the memory request signal MRQ; 6, a central processing unit (to be referred to as a CPU hereinafter) comprising the address register 1, the address translator 2, the real page address register 3, the selector 4, and the request controller 5; 7, an upper register, controlled by a control signal MRQC obtained by inverting the memory request MRQ, for storing the signal MAD output from the selector 4; 8, a lower register, controlled by the memory request signal MRQ output from the request controller 5, for storing the signal MAD output from the selector 4; 9, an inverter for inverting the memory request signal MRQ output from the request controller 5 and outputting the inverted signal to the upper register 7 as the control signal MRQC; and 10, a main memory unit (to be referred to as an MMU hereinafter) comprising the upper register 7, the lower register 8, and the inverter 9. The upper and lower registers 7 and 8 of the MMU respectively output a memory page address signal MPAD and a memory intra-page address signal MPRA to a memory controller (not shown).

Figure 2:
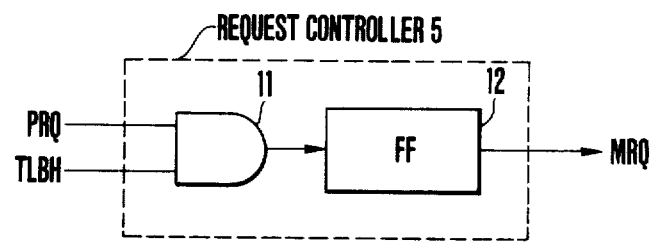
FIG. 2 is a circuit diagram showing part of the circuit in FIG. 1 in detail.

FIG. 2 shows a detailed circuit arrangement of the request controller 5 in FIG. 1.

Referring to FIG. 2, the request controller 5 comprises an AND gate 11 for receiving the request signal PRQ and the translation success signal TLBH, and a flip-flop (FF) for receiving an output signal from the AND gate 11 and outputting the memory request signal MRQ.

An operation of the memory access system shown in FIGS. 1 and 2 will be described below.

FIGS. 3(a) to 3(h) show the states of the respective signals in three periods T1, T2, and T3.

Figure 3:
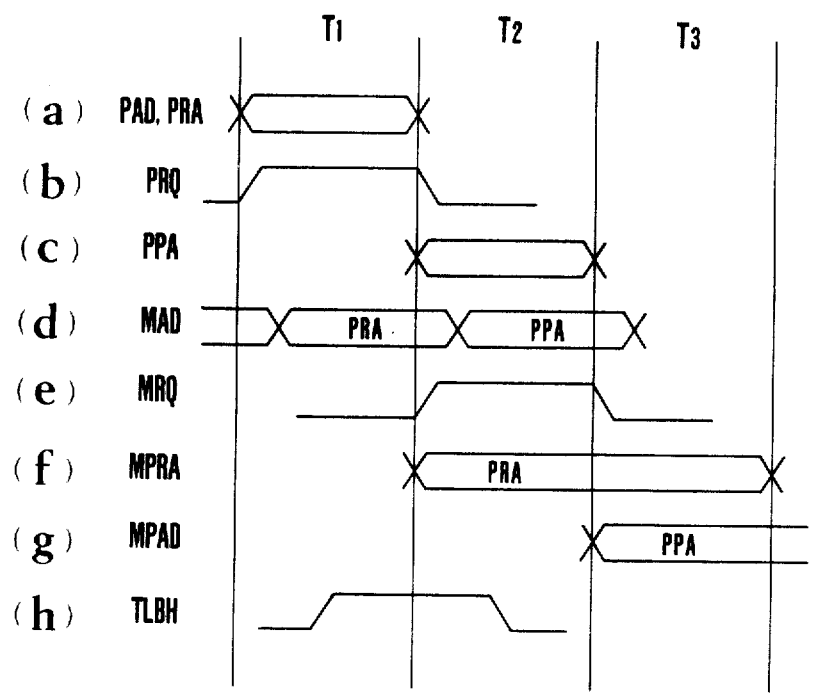
FIGS. 3(a) to 3(h) are timing charts for explaining an operation of the circuit in FIG. 1.

In the first period T1, a memory access request is generated by a main processing section (not shown) of the CPU 6. As a result, the logical address LAD is stored in the address register 1 and the request signal PRQ is set at logic "1", as shown in FIGS. 3(a) and 3(b). The logical page address signal LPA in the logical address signal LAD stored in the address register 1 is supplied to the page address translator 2. The page address translator 2 translates the logical page address signal LPA into a real page address signal, outputs the translated signal to the real page address register 3 as the translated real page address signal TBAD, and causes the register 3 to store the signal TBAD. Then, the page address translator 2 outputs the page translation success signal TLBH representing whether page address translation has been successful or not to the request controller 5 at a timing within the period T1 shown in FIG. 3(h). At the same time, the intra-page address signal PRA is output from the address register 1 to the selector 4.

As shown in FIG. 2, in the request controller 5, the logical product of the request signal PRQ and the address translation success signal TLBH is obtained by the AND gate 11. When the address translation success signal TLBH is in a logic "0" state, the memory request signal MRQ is in a logic "0" state. The selector 4 selects the intra-page address signal PRA whenever the memory request signal MRQ is not in a logic "1" state, and outputs it as the memory address signal MAD, as shown in FIG. 3(d), so as to cause the upper register 7 to store it.

When the address translation success signal TLBH is set at logic "1" (FIG. 3(h)), the flip-flop 12 of the request controller 5 is set at logic "1". Consequently, as shown in FIG. 3(e), the memory request signal MRQ is set at logic "1" in the second period T2.

When the request signal MRQ is set at logic "1" in the second period T2, the selector 4 selects the real page address signal PPA, and outputs it as the memory address signal MAD, as shown in FIG. 3(d). When the memory request signal MRQ is set at logic "1", the control signal MRQC for the upper register 7 is set at logic "0" by the inverter 9, and a control signal for the lower register 8 is set at logic "1". When the memory request signal MRQ is set at logic "1", the request is signaled to a memory controller (not shown), and the real page address is stored in the lower register 8. In this case, since the control signal MRQC for the upper register 7 is set at logic "0" by the inverter 9, the intra-page address signal PRA set in the first period T1 is held. In the third period T3, the real page address PPA is stored in the lower register 8, and the intra-page address signal PRA is stored in the upper register 7. Then, the upper and lower registers 7 and 8 respectively output the memory intra-page address MPRA and the memory page address signal MPAD, both of which are respectively shown in FIGS. 3(f) and 3(g), to the memory controller (not shown).

As has been described above in detail, according to the memory access system of the present invention, since the fact that the non-address-translation portion of a logical address, i.e., the intra-page address, is established prior to address translation is utilized, the number of address signal lines can be decreased without degrading the performance. Therefore, the number of input-/output signal lines of an LSI chip or a mounting card can be decreased.

What is claimed is:

1. A memory access system for receiving a logical address and a memory request, translating the logical address into a real address, and accessing a memory by using the real address, comprising:
   first transmitting means for transmitting a non-address-translation portion, which is not an object to be translated, in the logical address to said memory through an address signal line in advance when the memory request associated with the logical address supplied to said memory is generated; and
   second transmitting means for transmitting an address-translation portion which is an object to be translated, in the logical address to said memory through said address signal line upon completion of address translation of the address-translation portion.

2. A memory access system comprising:
   an address register for respectively storing a logical page address and a logical intra-page address in upper and lower portions thereof;
   page address translation means for translating an output from the upper portion of said address register into a real page address and outputting a real page address signal representing the real page address and an address translation success signal representing that address translation is performed;
   a real page address register for storing the real page address signal output from said page address translation means;
   selector means responsive to a first control signal for selecting the output signal from the lower portion of said address register or the output signal from said real address register and outputting the selected signal as a memory address signal;
   a first register, controlled by a second control signal obtained by inverting the first control signal, for storing and outputting an intra-page address signal selected by said selector means;
   a second register, controlled by the first control signal, for storing and outputting the real page address signal selected by said selector means;
   first control signal generating means for generating the first control signal by using the address translation success signal and a signal representing a memory request, and outputting the first control signal to said selector means and said second register; and
   inverting means for inverting the first control signal to obtain the second control signal and outputting the second control signal to said first register.

3. A memory access system according to claim 2, wherein said first control signal generating means generates the first control signal such that, when the memory request has occurred and the logical address is loaded on said address register, the first control signal is non-active and said selector selects the output signal from the lower portion of said address register, thereby causing said first register to store the intra-page address, then, when the address translation success signal is supplied thereto, the first control signal becomes active to render said selector to select the output signal from the real address register, thereby causing said second register to store the real page address signal while said first register holds the intra-page address, and then said first and second registers simultaneously output the intra-page address signal and the real page address signal, respectively.

* * * * *